(No Model.)
L. H. CARR.
CUSHION TIRE FOR WHEELS.
No. 582,453. Patented May 11, 1897.
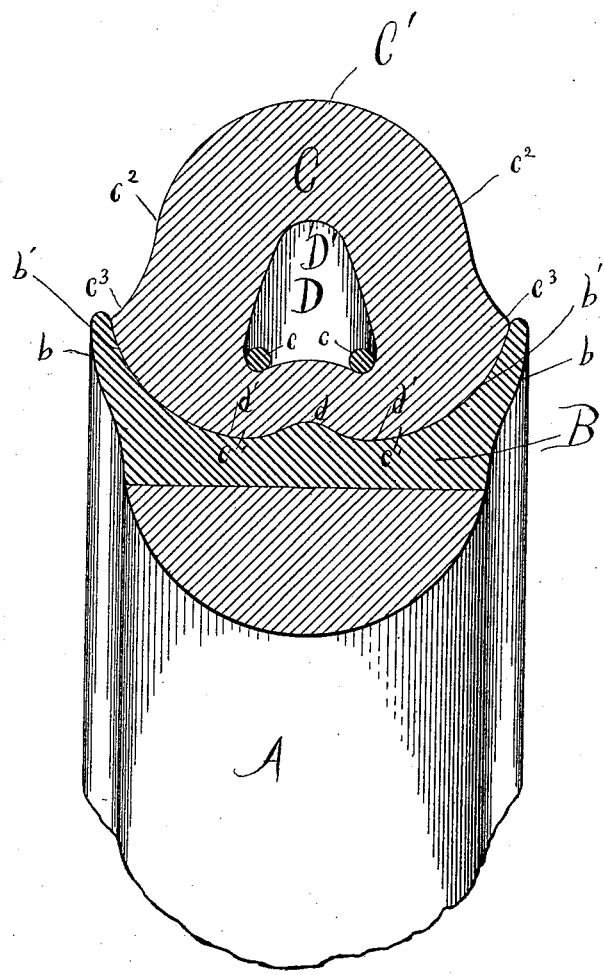
WITNESSES:
INVENTOR
Luther H. Carr
BY
Lynch, Doser & Donnelly
ATTORNEYS.

UNITED STATES PATENT OFFICE.

LUTHER H. CARR, OF CANTON, OHIO.

CUSHION-TIRE FOR WHEELS.

SPECIFICATION forming part of Letters Patent No. 582,453, dated May 11, 1897.

Application filed July 27, 1896. Serial No. 600,634. (No model.)

*To all whom it may concern:*

Be it known that I, LUTHER H. CARR, of Canton, Stark county, Ohio, have invented certain new and useful Improvements in Cushion-Tires for Wheels; and I do hereby declare the following to be a full, clear, and exact description of the invention, such as will enable others skilled in the art to which it pertains to make and use the same.

My invention relates to cushion-tires for wheels, and more especially to the construction of said tire and the manner of securing it in place on the wheel.

My invention consists in so forming the rim and cushion-tire that the said tire will not be cut by the edges of the rim, also in so forming the rim and tire that the tire cannot slip or roll in the rim, and the securing wires or bands are so located as to prevent said slipping or rolling, all of which will be hereinafter set forth and claimed.

In the drawing the figure represents a transverse section taken through the cushion-tire, the rim, and the felly, showing the relation of the parts one to the other and the manner of securing them together.

A represents the felly of a wheel, to which is secured the rim B in any usual or suitable manner.

C represents the cushion-tire, and $c\ c$ the securing wires or bands.

The felly A is of any usual or suitable construction.

The rim B, surrounding and secured to the felly A, is formed of suitable metal, such as wrought iron or steel, and is provided with side flanges $b\ b$. The outer contour of the flanges $b\ b$ may be such as to extend out sidewise from the felly A, as shown. The inner contour of the rim B and its flange $b\ b$ is such as to form curved sides $b'\ b'$, which meet at the bottom in a raised curved ridge $d$, thus forming two depressed circumferential channels $d'\ d'$ or a main circumferential channel having its bottom provided with two depressions $d'\ d'$ and concave sides $b'\ b'$.

The cushion-tire C has its inner circumference $c'\ c'$ formed so as to conform to the main channel of the rim. The tread portion C' of the cushion-tire is arch-shaped in cross-section, gradually developing at the sides in ogee curves $c^2 c^2$, leaving offset-shoulders $c^3 c^3$. The shoulders $c^3\ c^3$ are located beneath the outer periphery of flanges $b\ b$.

D represents an inverted approximately heart-shaped opening which extends through the center of the tire C. The apex D' of the opening may be more or less pointed, if desired. The bands or wires $c\ c$ are located in the depressed portions of the opening D and are located above the channels $d'\ d'$, and thus bind the two convex projections $e'\ e'$ into the channels $d'\ d'$ and prevent the tire from rolling and also hold it tightly to its seat in the rim.

The inverted heart-shaped opening D allows of the tire being compressed more easily and still be firm enough to sustain the necessary weight.

What I claim is—

1. In combination with a flanged wheel-rim, a rubber tire having a base formed of two convex parts and a center formed hollow, said hollow center being heart-shaped in cross-section, and two tightening-bands within said opening for the purpose of securing the tire to the rim, substantially as set forth.

2. The combination with a flanged wheel-rim, of a rubber tire having two convex projections at its base adapted to fit within the wheel-rim, and a circumferential opening formed approximately in the center of said tire, said opening being heart-shaped in cross-section with the wires or tightening-bands located in the depressed portion of said opening for the purpose of holding said tire to the wheel-rim, substantially as shown and described.

3. In combination with a wheel-rim, a rubber tire having a base formed of two convex parts and a center formed hollow, said hollow center having two tightening-bands within said opening for the purpose of securing the tire to the rim, substantially as shown and described.

In testimony whereof I sign this specification, in the presence of two witnesses, this 21st day of July, 1896.

LUTHER H. CARR.

Witnesses:
 W. E. DONNELLY,
 ELLA E. TILDEN.